June 15, 1965   F. THEIJSMEIJER   3,189,165
LATERAL BEND-TYPE CONVEYER
Filed April 23, 1963   2 Sheets-Sheet 1

INVENTOR.
FREDERIK THEIJSMEIJER
BY
*Browne, Schuyler & Beveridge*
ATTORNEYS.

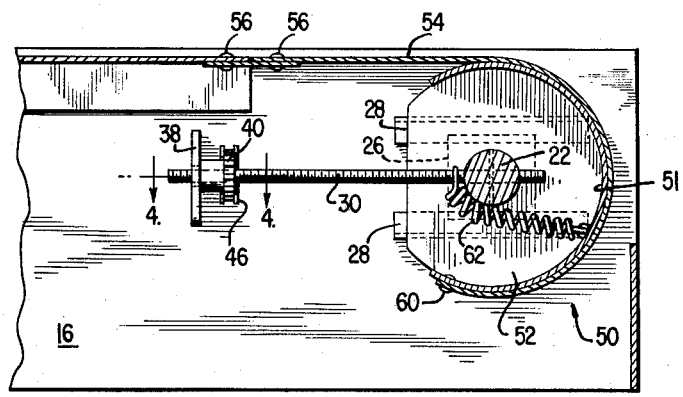
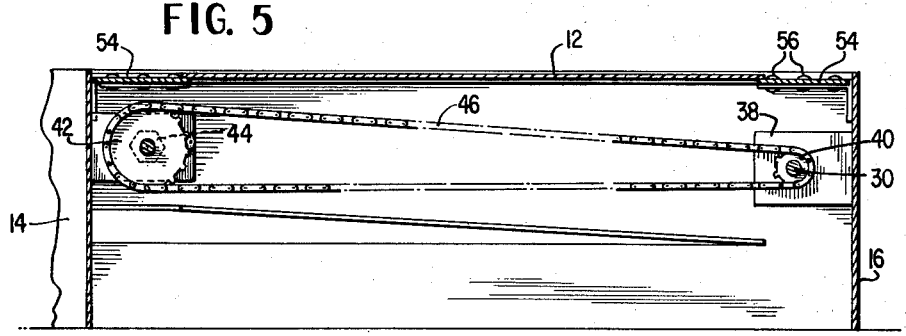
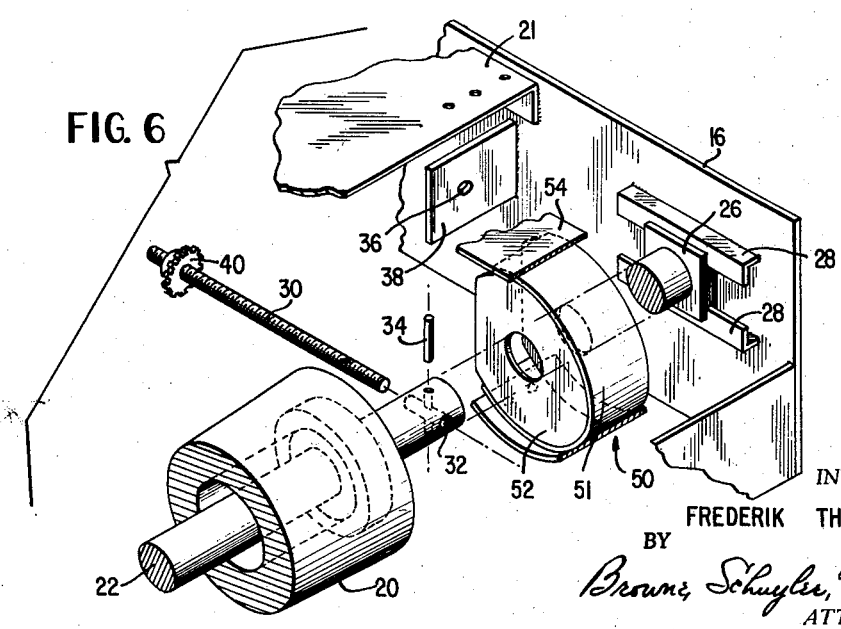

United States Patent Office 3,189,165
Patented June 15, 1965

3,189,165
LATERAL BEND-TYPE CONVEYER
Frederik Theijsmeijer, Port Hope, Ontario, Canada, assignor to Mathews Conveyer Company, Ellwood City, Pa., a corporation of Pennsylvania
Filed Apr. 23, 1963, Ser. No. 275,033
6 Claims. (Cl. 198—182)

This invention relates to curved endless belt conveyers, and more particularly to a curved endless belt conveyer having an improved belt take-up mechanism.

Conveyer systems employing an endless belt moving in an arcuate path, commonly called belt turns, are well-known in industry and conventionally comprise a belt mounted on frusto-conical end rollers mounted between an inner and outer guide rail, near the respective ends thereof, and having their respective axes disposed radially with respect to the arcuate path of the belt. The belt is supported in its path by a stationary table, or slidertread, extending between the two guide rails from a position adjacent the respective end rollers.

In order to facilitate installation and removal of the belt and to provide a means of adjusting the tension in the belt during operation, it is necessary to provide a belt take-up means. This may be accomplished by mounting one of the end rollers for movement along the guide rails. However, in order to minimize the tendency of the belt to move radially inward, and to maintain a uniform tensile load across the width of the belt at the roller, it is essential to retain the radial relation between the two end rollers. Therefore, if this radial relation is to be maintained, the respective ends of the roller must be moved an unequal distance, the distance which each end is moved being proportional to the radius of curvature of the associated respective guide rails.

In order to minimize the possibility of articles passing between the slidertread and end rollers, it is desirable to minimize or eliminate any opening between these parts. This problem is particularly acute in certain installations such as baggage handling systems in air terminals where identification tags or the like may become caught and pulled from the baggage.

It is an object of this invention to provide a belt turn having an improved belt take-up mechanism including an adjustable end roller which retains its radial relation with respect to the belt turn regardless of its position of adjustment.

It is another object of this invention to provide an improved belt turn including means to move one of the end rollers about an arcuate path having the same radial center as the curved belt.

Another object of this invention is to provide a belt turn having an improved take-up mechanism including means automatically extending or retracting the surface of the belt support table to maintain a continuous unbroken surface between the table and the surface of the roller regardless of the adjusted position of the roller.

In the attainment of the above and other objects, an important feature of the invention resides in the employment of a frusto-conical end roller rotatably mounted on a shaft which, in turn, is slidably mounted on tracks on the respective curved guide rails. A pair of adjusting screws are operatively connected to the shaft, one near each end thereof, and extend through brackets projecting from the guide rails. Sprockets are threadedly mounted on the screws and adapted to engage the brackets to axially project the screws and slide the shaft along the tracks. A chain is passed over the two sprockets to insure simultaneous movement of the two sprockets when either one is rotated. The ratio of the pitch diameter of the two sprockets is inverse to the radii of the associated guide rails so that the ends of the shaft will be moved along tracks at the proper rates to maintain the end roller radially disposed with respect to the other end roller.

To provide a closed joint between the slidertread and the adjustable end roller, a substantially circular collar is rotatably mounted on the adjustable roller shaft adjacent each end of the roller. The respective collars are each of a diameter substantially equal to the diameter of the adjacent ends of the end roller. A length of flexible material is attached to the surface of the responsive collars and to the end of the slidertread, and the collars are rotatably biased in a direction to retain the strips under tension to completely close the slidertread and the end roller.

Other objects and advantages of this invention will become apparent by reference to the following specification taken in conjunction with the accompanying drawings in which:

FIG. 3 is a partial section view taken on line 3—3 of FIG. 2.

FIG. 5 is a sectional view taken on line 5—5 of FIG. 2.

FIG. 6 is an exploded perspective view of the end roller mounting and take-up arrangement.

Figure 1:
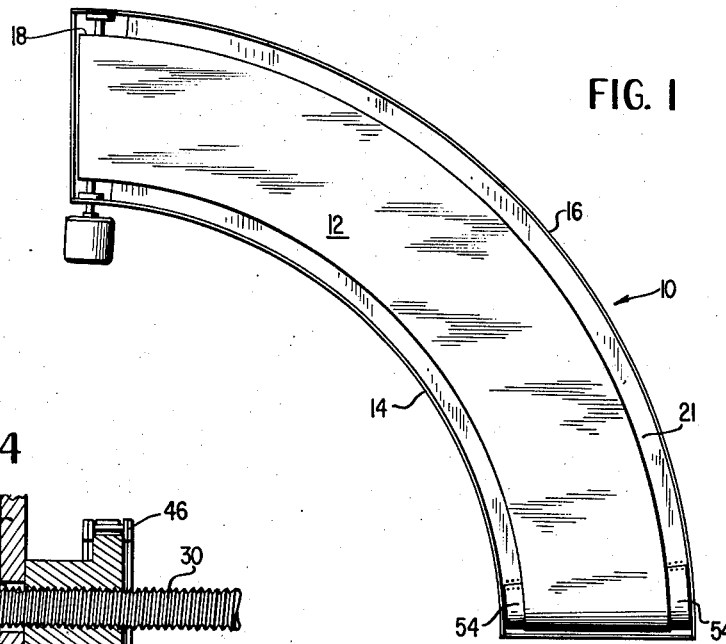
FIG. 1 is a plan view of a belt turn constructed in accordance with this invention.
Figure 4:
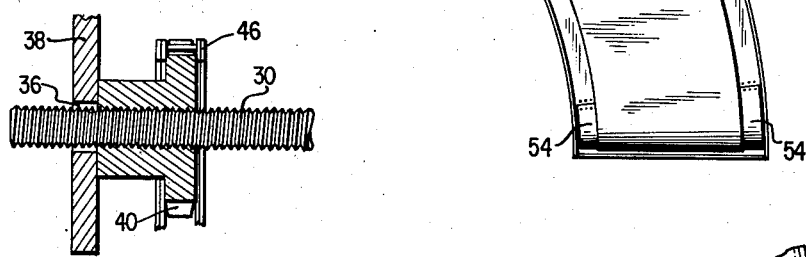
FIG. 4 is a sectional view taken on line 4—4 of FIG. 3.
Figure 2:
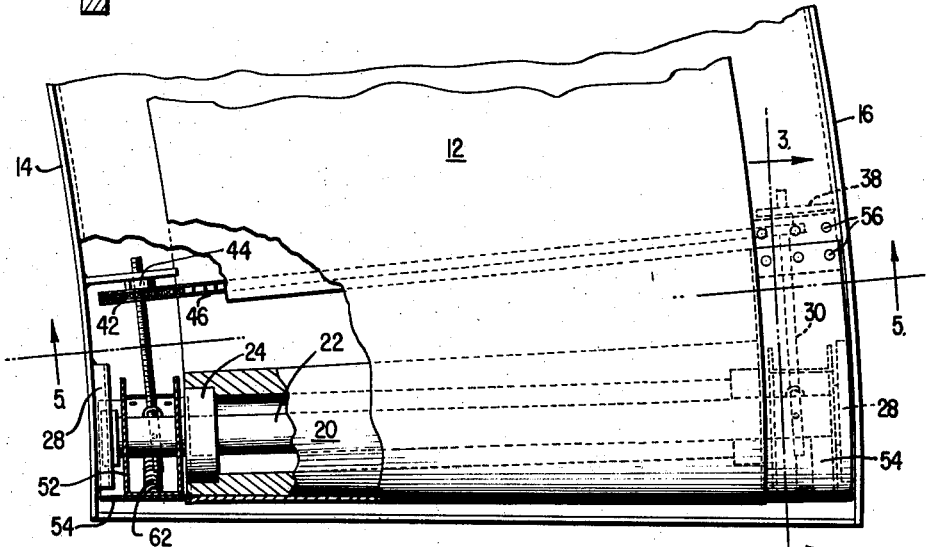
FIG. 2 is a plan view of a portion of the belt turn shown to an enlarged scale with parts broken away to disclose parts otherwise hidden from view.

Referring now to the drawings in detail, a belt turn 10 is shown in which an endless curved belt 12 moves in an arcuate path between curved guide rails 14 and 16. Belt 12 is mounted on a pair of frusto-conical end rollers 18, 20 mounted between the guide rails, one at each end thereof. A flat table member, or slidertread, 21 extends between guide rails 14 and 16 from a position near the end rollers 18 and 20 to support the upper surface of belt 12 to maintain it in a horizontally disposed position. Rollers 18 and 20 are mounted with their axes disposed radially with respect to the arcuate belt and guide rails.

Roller 20 is rotatably mounted on shaft 22 by a pair of precision bearings 24. Shaft 22 is slidably mounted, as by block 26 in horizontal tracks 28 on guide rails 14 and 16.

A threaded shaft 30 has an end extending through a transverse opening 32 in shaft 22, and is releasably retained therein as by roll pin 34. The other end of rod 30 extends through an opening 36 is a bracket 38 projecting from guide rail 16. A sprocket is threadedly mounted on rod 30 and adapted to engage bracket 38 to axially project rod 30 to slide block 26 along tracks 28 to tighten belt 12.

The arrangement for moving the other, or inboard, end of roller 20 is identical to that described above with the exception that sprocket wheel 42 is of a larger diameter than wheel 40, the ratio of their pitch diameters being inverse to the ratio of the radius of curvature of the guide rails 14 and 16. Also, sprocket wheel 42 is provided with a hexagonal hub portion 44 to facilitate rotation by a wrench or other suitable tool.

A drive chain extends around wheels 40 and 42 so that rotation of one of the sprocket wheels will result in simultaneous rotation of the other sprocket wheel in the same direction. Also, since the ratio of the pitch diameters of the two sprocket wheels is inverse to the ratio of the radius of curvature of rails 14 and 16, the amount of rotation of the sprockets, and consequently the distance which the respective ends of roller 20, are slid along tracks 28 will be directly proportional to the radius of the associated guide rails. Thus, by rotating sprocket 42, roller 20 may be adjusted to tighten or loosen the belt 12 while maintaining the radial relation of the two end rollers.

To prevent the creation of a gap or opening between table 21 and the end roller 22, a cap assembly 50, best seen in FIGS. 3 and 6, is provided at each end of roller 22. Since the caps on each end of the roller are identical except for size, only one will be described in detail. A substantially circular collar 51 is rotatably mounted on shaft 22 by a pair of end plates 52. An elongated strip 54 of suitable flexible material is attached, as by rivets 56 to slidertread 21 adjacent guide rail 16. Strip 54 is of sufficient width to extend from rail 16 to a point beneath the edge of belt 12, so as to completely fill the space therebetween, and of a sufficient length to extend from the end of slidertread 21 around collar 50 to a point near the bottom where it is securved as by rivets 60. Spring 62 resiliently urges cylinder 50 for rotation in a direction to maintain strip 54 under tension.

From the above, it can be seen that a belt turn is provided with a take-up mechanism which permits ready adjustment of the tension on the belt by adjustment of one of the end rollers, and at the same time maintain the perfect radial relation between the two end rollers. Also, the roller may be moved in or out within the limits of the adjusting mechanism without the creation of openings between the slidertread and roller into which articles may become caught. This is extremely important in certain installations such as baggage conveyers in air terminals in which identification tags or the like on articles being conveyed are extremely susceptible to being caught in such openings.

While I have described and illustrated a preferred embodiment of my invention, I wish it understood that I do not intend to be restricted solely thereto, but that I do intend to cover all embodiments thereof which would be apparent to one skilled in the art and which come within the spirit and scope of my invention.

I claim:

1. In a curved conveyer having spaced curved side rails, a take-up roller mechanism comprising a roller, tracks on the side rails of the conveyer mounting the end of the roller for sliding movement therealong, and differential adjusting means for simultaneously sliding the ends of the roller along said tracks in proportion to the respective radii of said curved rails.

2. In a curved conveyer having an endless belt moving between spaced concentric curved side rails, a belt tightening mechanism comprising a frusto-conical end roller, tracks on the side rails, a bearing block mounted on each of said tracks for mounting the respective ends of said roller for sliding movement therealong, and differential adjusting means for simultaneously sliding the respective bearing blocks and the ends of said roller supported thereby along said tracks in proportion to the respective radii of said rails.

3. In a curved conveyer having an endless belt moving between spaced concentric curved side rails, a frusto-conical roller at each end of the conveyer, a table extending between said side rails and supporting said belt means between said rollers, a belt tightening mechanism comprising tracks on each of the side rails mounting the respective ends of one of said rollers for sliding movement therealong, differential adjusting means for simultaneously sliding the ends of said one of said rollers along said track in proportion to the respective radii of said rails, and means automatically extending or retracting the edges of said table adjacent said rails in response to movement of said roller to provide a closed joint between said belt and said rail from the end of said table to said roller.

4. A curved conveyer having an endless belt moving between spaced curved side rails, a belt tightening mechanism comprising a frusto-conical end roller rotatably mounted on a shaft extending between said side rails, track means on said rail mounting the ends of said shaft for sliding movement therealong, and differential adjusting means for simultaneously sliding the ends of said shaft along said tracks in proportion to the radii of the respective side rails.

5. The invention according to claim 4 wherein the differential adjusting means comprises a bracket on each of said rails, an adjusting screw extending through each of said brackets and operatively connected to said shaft, and means axially projecting said adjusting screws to slide said shaft along said tracks in proportion to the radii of the respective side rails.

6. The invention according to claim 5 wherein the means for axially projecting said rod comprises a sprocket threadedly mounted on said adjusting screws and engaging said brackets, the diameter of said sprockets being inversely proportional to the radii of the respective side rails, and chain means extending around said sprockets whereby when one sprocket is rotated to project or retract its associated adjusting screw the other sprocket is automatically rotated to project its associated adjusting screw an amount proportional to the radii of their respective guide rails.

References Cited by the Examiner

UNITED STATES PATENTS

| 2,306,448 | 12/42 | Kratz | 198—208 |
| 2,828,003 | 3/58 | Witzel | 198—208 |
| 3,100,565 | 8/63 | Fry | 198—182 |

SAMUEL F. COLEMAN, *Primary Examiner.*

ERNEST A. FALLER, JR., *Examiner.*